UNITED STATES PATENT OFFICE.

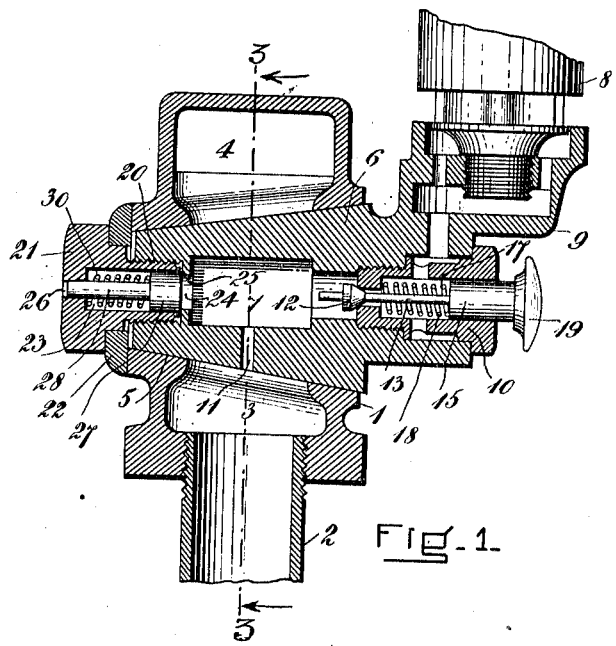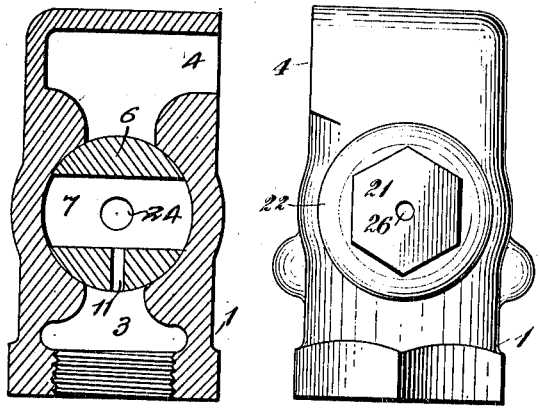

BENJAMIN J. GRAHAM, OF BEVERLY, MASSACHUSETTS, ASSIGNOR TO CHARLES H. SHERBURNE, OF BOSTON, MASSACHUSETTS.

SIGNAL-COCK.

1,088,817.

Specification of Letters Patent. Patented Mar. 3, 1914.

Application filed April 30, 1913. Serial No. 764,673.

*To all whom it may concern:*

Be it known that I, BENJAMIN J. GRAHAM, of Beverly, in the county of Essex and State of Massachusetts, a citizen of the United States, have invented a new and useful Improvement in Signal-Cocks, of which the following is a full, clear, and exact description, reference being had to the accompanying drawing, forming a part of this specification, in explaining its nature.

The present invention relates to an improvement in signal cocks and especially to a signal cock for air brake systems like that shown in Letters Patent of the United States issued to Charles W. Sherburne November 15, 1910, No. 975,645. According to the construction shown in that patent the signal cock consists of a valve within a casing turned by a lever or handle the operation of which releases air from the brake system for stopping a train. The lever or handle serves, also, as a whistle or alarm sounded from the pressure within the brake system, the patented construction referred to providing a means or device by which air from the brake system may be liberated for sounding the whistle without the necessity of moving the lever or handle.

Inasmuch as the device is especially adapted for use upon the rear end of a train when the train is backing up it becomes primarily and of the utmost importance for the operator to know whether there is sufficient pressure within the brake system to operate the brakes for stopping the train. Inasmuch, also as the whistle is used as an alarm to warn persons on or alongside the track, it becomes imperative that the operator should know whether or not there is sufficient pressure within the brake system to sound the whistle.

It is accordingly the object of the present invention to provide a signal cock with a device by which at all times it may be ascertained whether there is sufficient pressure in the brake system to stop the train or sound the whistle, the special object being to provide an indicating device of simple and inexpensive character but accurate and constant in its operation.

The invention can best be seen and understood by reference to the drawings, in which—

Figure 1 shows in cross vertical section a signal cock fitted with an indicating device embodying the present invention, and Fig. 2 is a rear elevation thereof. Fig. 3 is a section on the line 3—3 of Fig. 1.

Referring to the drawings:—1 represents the body of the cock. This consists of a hollow casing fitted to a pipe 2 which connects with or forms a part of a brake system or other apparatus (not shown). The interior of the body of the cock is formed to provide an inlet passage or opening 3 into which air from the pipe 2 first enters the casing, an outlet passage or opening 4 which connects with the atmosphere, and between the passages 3 and 4 a valve chamber 5.

The valve chamber 5 is conical in form and fitting to turn therein is a plug valve 6 which is held in place to turn within the casing by means to be later described. The valve is provided with a cross-passage 7 extending diametrically through it and so arranged that when the valve has been turned from a closed to a determinate position this passage will form a direct communication between the inlet passage 3 and the outlet passage 4, thereby permitting air from the pipe 2 to be exhausted to the atmosphere.

The valve 6 is turned by means of a handle or lever 8 which connects with the forward end of the valve through an angularly-projecting connection 9. The lever or handle 8 constitutes also a whistle which is blown by the air or pressure from the brake system entering the cross-passage 7 in the valve and from thence directed to the whistle through a series of connected passages which extend through the forward end of the valve, a plug 10 fitting therein and through the connection 9 to the whistle. Inasmuch as the whistle would ordinarily be blown only when the valve 6 was in a closed position (as shown in Figs. 1 and 3) or when the valve was so turned that the passage 7 no longer formed a connection between the inlet and outlet passages 3 and 4 of the casing provision is made whereby the air or pressure from the brake system may then enter the passage 7 by means of a by-pass 11 which extends through the wall of the valve at right angles to the passage 7 therein, thereby forming communication between the inlet passage 3 in the casing and the cross-passage 7 in the valve.

The issuance of air from the cross-passage 7 to the whistle for blowing it is under the control of the operator, communication being normally closed by a valve 12 arranged to become seated against the inner end of the plug 10 for closing the passage through it, thereby shutting off communication between the pasage 7 of the main valve and the whistle. The valve 12 is arranged upon a rod 13 fixed to a butt or piston 15 slidably arranged within a socket 17 formed in the plug 10. The valve 12 is held in a normally closed position by means of a spring 18 arranged upon the rod 13 and interposed between the inner end of the piston and that of the socket. Upon its outer end the piston is provided with a push button or head 19. Upon the application of pressure to this head the piston will be advanced, overcoming the tension of the spring, and the valve 12 will open, when air will pass from the passage 7 to the whistle. Upon the release of pressure from the push button the parts will be returned to their normal positions by the spring, when the valve 12 will again become closed.

The construction and operation of the parts above described is that referred to in the said patent where a more detailed description will be found.

It will be observed that according to the construction referred to the cross-passage 7 through the main valve forms, when the valve is in a closed position, what might be termed a pressure chamber with the same pressure as that in the brake system. Under certain circumstances it might be that the pressure within this chamber and brake system might be so reduced as to be no longer capable of blowing the whistle, and it is to a means or device whereby the operator may be apprised of such a situation that the present invention relates and to which reference will now be made.

Fitting into the inner end of the main valve and connecting therewith by a threaded connection is a shank 20 having a head 21. The head 21 is in the nature of a bolt adapted to be turned by a wrench for turning the shank 20 into the end of the valve, the combined parts then operating to hold the main valve snugly within the valve chamber, a washer 22 being preferably interposed between the head 21 and the adjacent side of the valve casing. The shank 20 and head 21, apart from the function just referred to, form also a combined socket-forming member, there being formed therein a socket 23 the inner end of which is in communication with the cross-passage 7 through a port or opening 24 formed in the main valve and which is purposely made slightly smaller in diameter than the diameter of the socket, thus leaving an annular flange 25 at the inner end of the socket. At the outer end of the socket 23 there proceeds therefrom through the head 21 an opening 26, this opening being very much smaller in diameter than the diameter of the socket.

Located within the socket 23 is a plunger 27 having attached to it an indicating stem 28. The disposition and arrangement of the plunger is such that the inner face thereof will form a portion of the wall of the cross-passage 7 when the plunger is in its innermost position. In other words, the normal disposition of the plunger is one at the inner end of the socket abutting against the flange 25 which frames the port or opening 24, access being had from the cross-passage 7 to the inner face of the plunger through this port or opening. The stem 28 of the plunger extends backwardly through the socket and into the opening 26 formed in the head, the wall forming this opening operating to guide the stem. The preferred length of the stem is such that when the plunger is in its innermost or normal position as aforesaid, the outer end of the stem will lie about flush with the outer face of the head 21.

Located within the socket around the stem of the plunger and interposed between the inner face of the plunger and the outer end wall of the socket is a spring 30 which by its tension operates to hold the plunger in its innermost position as aforesaid.

The operation of the indicating device is as follows: Pressure admitted to the cross-passage 7 will have direct access through the opening or port 24 to the inner face of the plunger, thereby tending to push out the plunger and stem against the tension of the spring 30 when the outer end of the stem will show beyond the face of the head, thereby indicating a certain pressure within the cross-passage 7 and the brake system. In this connection it is to be further understood that the tension of the spring 30 is such as to allow the plunger to be pushed out and the indicating stem show beyond the face of the head only when there is sufficient pressure within the cross-passage 7 and brake system to stop the train or blow the whistle.

Having thus fully described my invention, I claim and desire to secure by Letters Patent of the United States:—

1. In a signal cock, the combination of a body having inlet and outlet passages and a valve chamber between said passages, a main valve operable within said valve chamber, a sounding device, said main valve having a cross-passage through it forming a connection between said inlet and outlet passages when said valve is open, said main valve having also a by-passage extending from said inlet passage to said cross passage when said main valve is in a closed position and a further passage extending from said cross-passage to said sounding device, means for controlling the passage to said sounding device from said cross-passage and an indicating device for indicating the pressure within said cross-passage, the same comprising a plunger having an indicating stem, the inner face of said plunger forming a portion of the wall of said cross-passage whereby said plunger may be moved out by pressure within said cross-passage and the stem thereof assume an exposed position, and means for normally holding said plunger in its innermost position whereby it may be moved out only by a determinate pressure within said cross-passage.

2. In a signal cock, the combination of a body having inlet and outlet passages and a valve chamber between said passages, a main valve operable within said valve chamber, a sounding device, said main valve having a cross-passage through it forming a connection between said inlet and outlet passages when said valve is open, said main valve having also a by-passage extending from said inlet passage to said cross passage when said main valve is in a closed position and a further passage extending from said cross-passage to said sounding device, means for controlling the passage to said sounding device from said cross-passage, a socket-forming member connecting with one end of said main valve, the socket within said member opening at the inner end thereof to said cross-passage, an indicating device for indicating the pressure within said cross-passage, the same comprising a plunger contained within the socket of said socket-forming member and having an indicating stem extending through the outer end of said member, the inner face of said plunger forming a portion of the wall of said cross-passage whereby said plunger may be moved out by pressure within said cross-passage and the stem thereof assume an exposed position, and means located within said socket for normally holding said plunger in its innermost position whereby it may be moved out only by a determinate pressure within said cross-passage.

3. In a signal cock, the combination of a body having inlet and outlet passages and a valve chamber between said passages, a main valve operable within said valve chamber, a sounding device, said main valve having a cross-passage through it forming a connection between said inlet and outlet passages when said valve is open, said main valve having also a by-passage extending from said inlet passage to said cross passage when said main valve is in a closed position and a further passage extending from said cross-passage to said sounding device, means for controlling the passage to said sounding device from said cross-passage, a holding member provided with a head retaining said main valve within said valve chamber, said member connecting with the inner end of said main valve and having a socket formed therein communicating with said cross-passage, an indicating device for indicating pressure within said cross-passage, the same comprising a plunger located within said socket and having an indicating stem extending outwardly through said head, the inner face of said plunger forming a portion of the wall of said cross-passage whereby said plunger may be moved out by pressure within said cross-passage and the stem thereof assume an exposed position beyond the face of said head, and means located within said socket for normally holding said plunger in its innermost position whereby it may be moved out only by a determinate pressure within said cross-passage.

BENJAMIN J. GRAHAM.

Witnesses:
GEORGIANIA M. STONE,
SAMUEL H. STONE.